(12) United States Patent
Kim (10) Patent No.: US 8,140,136 B2
(45) Date of Patent: Mar. 20, 2012

(54) SLIDE MODULE AND PORTABLE TERMINAL HAVING THE SAME

(75) Inventor: Sung-Han Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 476 days.

(21) Appl. No.: 12/421,594

(22) Filed: Apr. 9, 2009

(65) Prior Publication Data

US 2010/0081490 A1   Apr. 1, 2010

(30) Foreign Application Priority Data

Sep. 26, 2008   (KR) .................. 10-2008-0094962

(51) Int. Cl.
*H04M 1/00* (2006.01)
(52) U.S. Cl. ............... 455/575.4; 455/575.3; 361/600; 361/679.01; 361/814
(58) Field of Classification Search .......... 455/575.4, 455/575.3; 361/600, 679.01, 814
See application file for complete search history.

(56) References Cited

U.S. PATENT DOCUMENTS

| | | | |
|---|---|---|---|
| 7,403,612 B2* | 7/2008 | Nishihara | 379/433.12 |
| 7,496,388 B2* | 2/2009 | Kim | 455/575.4 |
| 7,761,123 B2* | 7/2010 | Hyun et al. | 455/575.1 |
| 7,831,285 B2* | 11/2010 | Lee | 455/575.4 |
| 7,941,192 B2* | 5/2011 | Mifune et al. | 455/575.4 |
| 7,966,049 B2* | 6/2011 | Jang | 455/575.4 |
| 2005/0000059 A1 | 1/2005 | Sung et al. | |
| 2006/0068859 A1* | 3/2006 | Lee et al. | 455/575.4 |
| 2007/0058328 A1* | 3/2007 | Zuo et al. | 361/679 |
| 2007/0155451 A1* | 7/2007 | Lee | 455/575.4 |
| 2008/0058039 A1* | 3/2008 | Lee et al. | 455/575.4 |
| 2009/0029748 A1* | 1/2009 | Lee | 455/575.4 |
| 2009/0262506 A1* | 10/2009 | Shi et al. | 361/727 |
| 2010/0226080 A1* | 9/2010 | Tsuchida et al. | 361/679.01 |
| 2011/0176756 A1* | 7/2011 | Shin et al. | 384/23 |

FOREIGN PATENT DOCUMENTS

EP   1501260   1/2005

* cited by examiner

*Primary Examiner* — Linh Nguyen
(74) *Attorney, Agent, or Firm* — Lee, Hong, Degerman, Kang & Waimey (57) ABSTRACT

A portable terminal includes a first body, a second body, and a slide module slidably coupling the first body and the second body, the first body and the second body sliding with respect to each other via the slide module, wherein the slide module includes a first slide member, a second slide member configured to slide with respect to the first slide member between a first position and a second position, and a fixation unit configured to position the first slide member and the second slide member stably at one of the first and second positions, wherein the fixation unit is further configured to allow only a sliding movement between the first and the second positions in a vertical direction, inhibiting relative movement of the first and second slide members in directions other than the vertical direction.

19 Claims, 10 Drawing Sheets

SLIDE MODULE AND PORTABLE TERMINAL HAVING THE SAME

CROSS-REFERENCE TO RELATED APPLICATIONS

Pursuant to 35 U.S.C. §119(a), this application claims the benefit of earlier filing date and right of priority to Korean Application No. 10-2008-0094962, filed Sep. 26, 2008, the contents of which are hereby incorporated by reference herein in their entirety.

FIELD OF THE INVENTION

The present invention relates to a portable terminal having a slide module configured to slide one body with respect to the other body.

DESCRIPTION OF THE RELATED ART

Portable terminals can be easily carried and have one or more of functions for supporting voice calls and video calls, inputting and/or outputting information, storing data and the like. As the portable terminals become multifunctional, the portable terminals can be used to capture still images or moving pictures, play music or video files, play games, receive broadcast and the like, so as to be implemented as an integrated multimedia device.

Various attempts have been made for the multimedia player by hardware or software in order to implement such complicated functions. For example, a user interface environment is provided in order for users to easily and conveniently retrieve or select functions. In addition to the attempts, schemes for improving functions of the hardware and the like may be considered.

SUMMARY OF THE INVENTION

In accordance with an embodiment, a portable terminal includes a first body, a second body, and a slide module slidably coupling the first body and the second body, the first body and the second body sliding with respect to each other via the slide module, wherein the slide module includes a first slide member, a second slide member configured to slide with respect to the first slide member between a first position and a second position, and a fixation unit configured to position the first slide member and the second slide member stably at one of the first and second positions, wherein the fixation unit is further configured to allow only a sliding movement between the first and the second positions in a vertical direction, inhibiting relative movement of the first and second slide members in directions other than the vertical direction.

In accordance with an embodiment, a slide module includes a first slide member, a second slide member configured to slide with respect to the first slide member between a first position and a second position, and a fixation unit configured to position the first slide member and the second slide member stably at one of the first and second positions, wherein the fixation unit is further configured to allow only a sliding movement between the first and the second positions in a vertical direction, inhibiting relative movement of the first and second slide members in directions other than the vertical direction.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawings.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
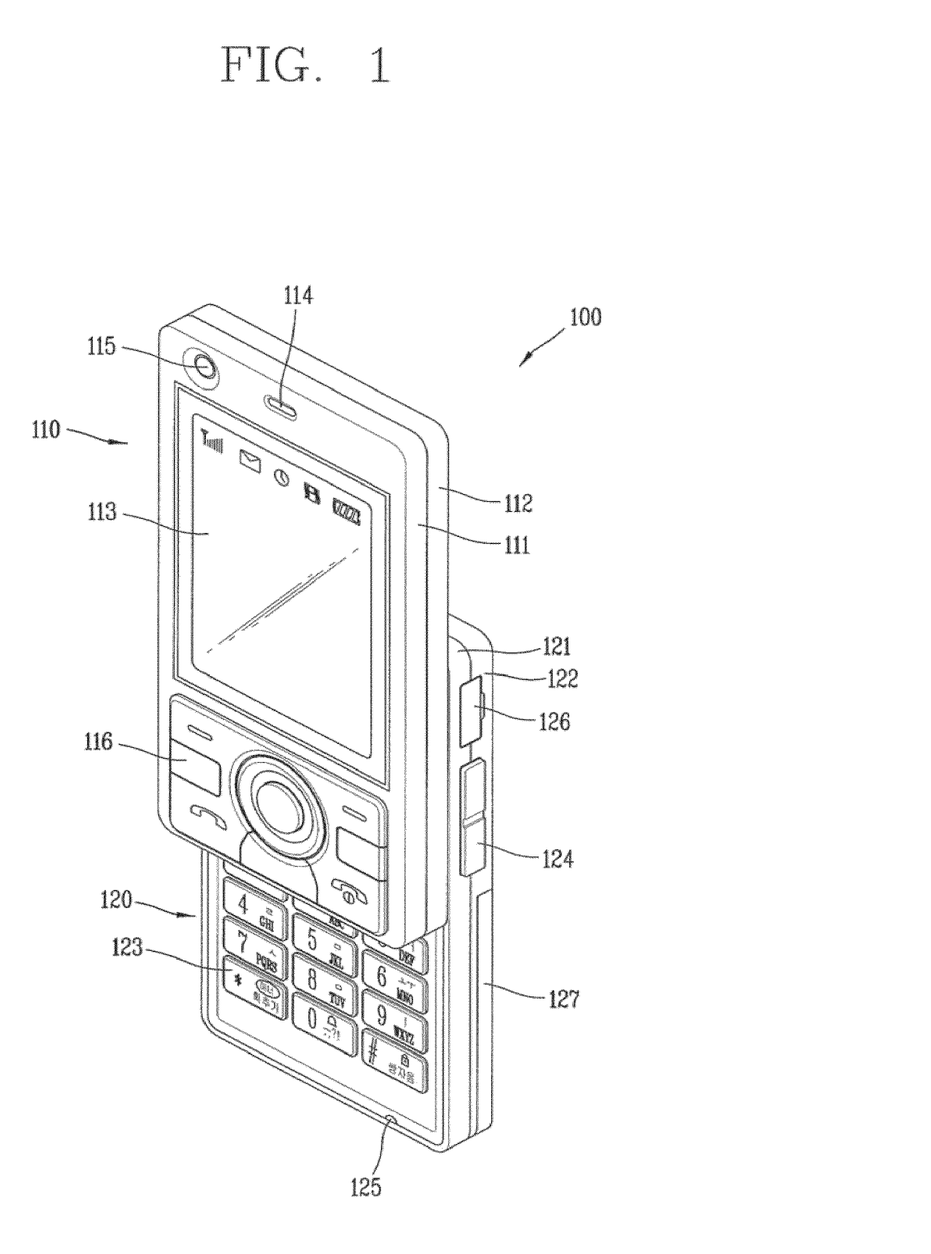
FIG. 1 is a perspective view of a portable terminal in accordance with an embodiment of the present invention.

FIG. 1 is a perspective view of a portable terminal 100 in accordance with an embodiment of the present invention. The portable terminal 100 includes first and second bodies 110, 120 slidably coupled to each other so as to implement an open configuration or a closed configuration by a sliding operation.

Referring to FIG. 1, the portable terminal 100 includes the first body 110 and the second body 120 configured to be slidable with respect to the first body 110 in at least one direction. However, the present invention is not limited thereto, and can be applied to various types of the portable terminal such as a swing type and a swivel type, for example.

Figure 2:
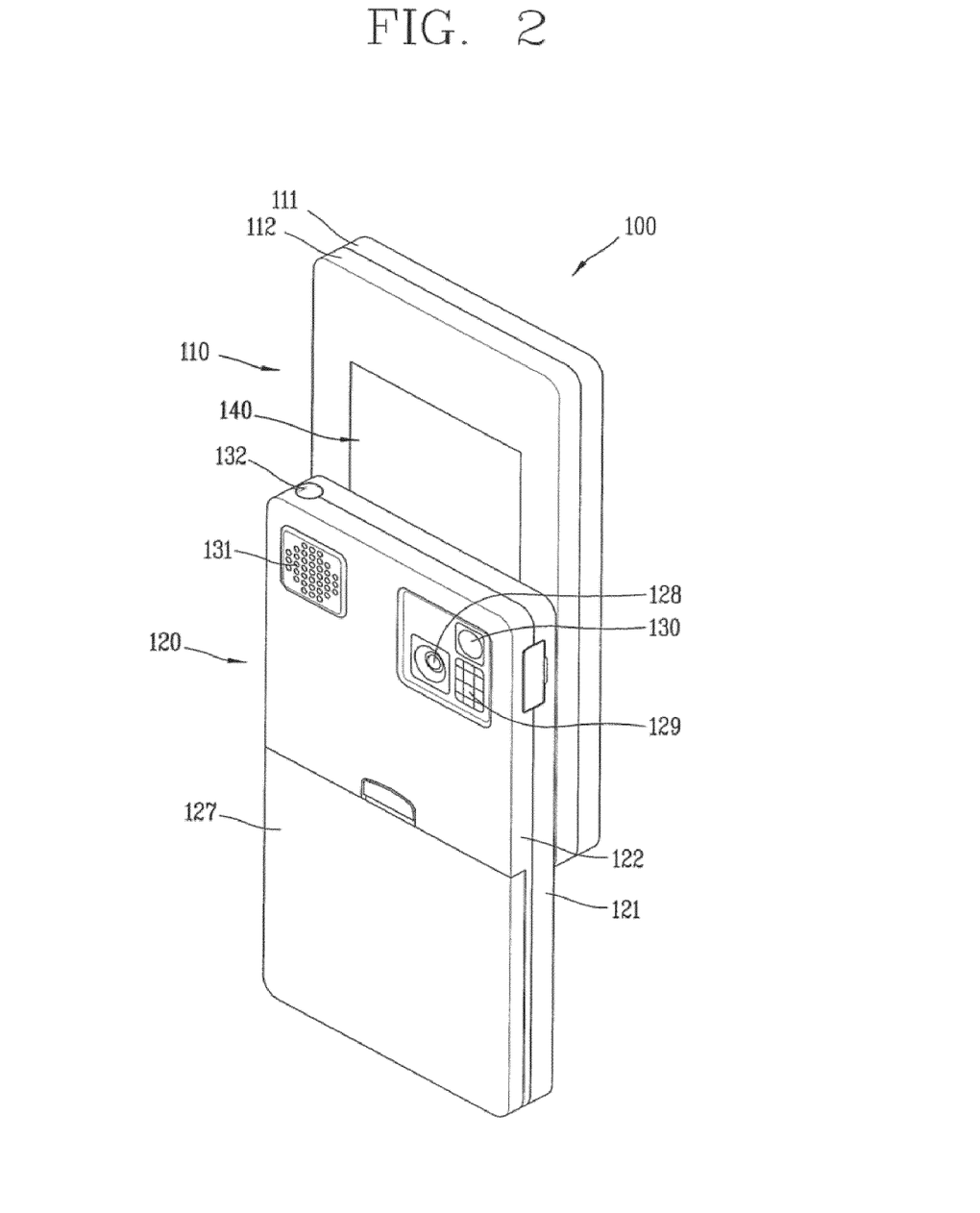
FIG. 2 is a rear perspective view of the portable terminal shown in FIG. 1.

A configuration in which the first body 110 is overlapped with the second body 120 may be referred to as a closed configuration, and a configuration in which at least one portion of the second body 120 is exposed under the first body 110 may be referred to as an open configuration. The open configuration of the portable terminal 100 is shown in FIGS. 1 and 2.

In the closed configuration, the portable terminal 100 is generically operated in a standby mode, but the standby mode may be released by a user's manipulation. In the open configuration, the portable terminal 100 is generally operated in a call mode, but the call mode may be switched into the standby mode by the user's manipulation or after a certain time elapses.

A case, such as a casing, a housing, a cover, and the like, forming an external appearance of the first body 110 is formed by a front case 111 and a rear case 112. Electronic components may be disposed in a space formed by the front case 111 and the rear case 112. At least one intermediate case may be additionally disposed between the front case 111 and the rear case 112. The cases may be formed of a synthetic resin in a manner of injection, or formed of a metallic material such as stainless steel (STS) or titanium (Ti).

A display 113, an audio output unit 114, a first image input unit 115 or a first manipulation portion 116 may be disposed at the first body 110, particularly, at the front case 111. The display 113 includes a Liquid Crystal Display (LCD) module, an Organic Light Emitting Diodes (OLED) module, a Transparent OLED (TOLED), and the like to visually represent information. The display 113 may further include a touch screen such that the user can input information in a touching manner. The display 113 may be configured to implement various tactile effects that can be felt by the user when the user touches the display. The display 113 may also be implemented by a haptic module interworking therewith. For example, the tactile effect generated by the haptic module includes vibration. The haptic module may be variously implemented according to configuration aspects of the portable terminal 100 as well as the display 113.

The audio output unit 114 may be implemented as a receiver or a speaker. The first image input unit 115 may be implemented as a camera module for capturing an image or a moving picture. The first manipulation portion 116 is configured to receive a command for controlling an operation of the portable terminal 100.

Similar to the first body 110, the second body 120 may include a front case 121 and a rear case 122. The front cases 111, 121 and the rear cases 112, 122 may be referred to as a case for the portable terminal 100. The second body 120 may be provided with a second manipulation portion 123, for example, on a front surface of the front case 121.

At least one of the front case 121 and the rear case 122 may be provided with a third manipulation portion 124, a first audio input unit 125 and an interface 126. The first to third manipulation portions 116, 123, 124 may be broadly called as a manipulation portion, which can be manipulated by any manner, for example, a tactile manner.

For example, the manipulation portion may be implemented as a dome switch, a touch screen or a touch pad by which a user can input commands or information in a pushing or touching manner. Alternatively, the manipulation portion may be implemented, for example, as a wheel, a jog or a joystick.

Functionally, the first manipulation portion 116 is configured to input commands such as start, end, scroll or the like, and the second manipulation portion 123 is configured to input figures, letters, symbols or the like. The third manipulation portion 124 can be configured as a hot key for performing a specific function, such as activating the first image input unit 115.

The first audio input unit 125 may be implemented, for example, as a microphone to receive user's voice or other sound. The interface 126 serves as a path which allows the portable terminal 100 to exchange data with external devices. For example, the interface 126 may be used in a wired or wireless manner, and may be at least one of a connection terminal to which an earphone is connected, power supply terminals for supplying power to the portable terminal, or a port for a local communication, such as infrared data (IrDA) port, BLUETOOTH port, wireless LAN port, or the like. The interface 126 may be a card socket for receiving an external card, such as a Subscriber Identification Module (SIM) and a User Identity Module (UIM), or a memory card for storing information.

A power supply unit 127 may be disposed at the rear case 122 so as to supply power to the portable terminal 100. The power supply unit 127 may be implemented as a rechargeable battery, for example, and be detachably coupled so as to perform a charging process.

FIG. 2 is a rear perspective view of the portable terminal 100 shown in FIG. 1. Referring to FIG. 2, a second image input unit 128 may be additionally disposed at a rear surface of the rear case 122 of the second body 120. The second image input unit 128 has a shooting direction substantially opposite to a direction of the first image input unit 115 shown in FIG. 1. The second image input unit 128 may be implemented as a camera having a resolution different from that of the first image input unit 115.

For example, the first image input unit 115 has low resolution so that a user's face can be captured and then transmitted to a correspondent party in case of a video call, while the second image input unit 128 has high resolution since it is mainly used to capture a general object of which the image is not immediately transmitted.

A flash 129 and a mirror portion 130 may be additionally disposed adjacent to the second image input unit 128. When capturing an object by using the second image input unit 128, the flash 129 emits light on the object. When the user captures himself/herself by using the second image input unit 128, the mirror portion 130 can be used for the user to look at himself/herself therein.

The rear case 122 may be additionally provided with a second audio output unit 131. The second audio output unit 131 may be implemented as a stereo together with the first audio output unit 114 shown in FIG. 1 or may be used in a speakerphone mode.

One side of the rear case 122 may be provided with an antenna 132 for receiving broadcast signals in addition to an antenna for communication. The antenna 132 may be installed to be extendable from the second body 120.

One portion of a slide module 140 by which the first body 110 and the second body 120 are slidably coupled to each other is disposed at the rear case 112 of the first body 110. Another portion of the slide module 140 is disposed at the front case 121 of the second body 120, thus may not be outwardly exposed.

While the second image input unit 128 is disposed at the second body 120 according to the above description, it is not limited thereto. For example, it is possible to mount at least one of components 128 to 132 disposed at the rear case 122, such as the second image input unit 128, to the first body 110, particularly, to the rear case 112 thereof. In this case, it is advantageous that the component(s) disposed at the rear case 112 is protected by the second body 120 in the closed configuration. Further, even if the second image input unit 128 is not provided, the first image input unit 115 may be rotatably formed such that it can capture an image in the same shooting direction as the second image input unit 128.

Figure 3:
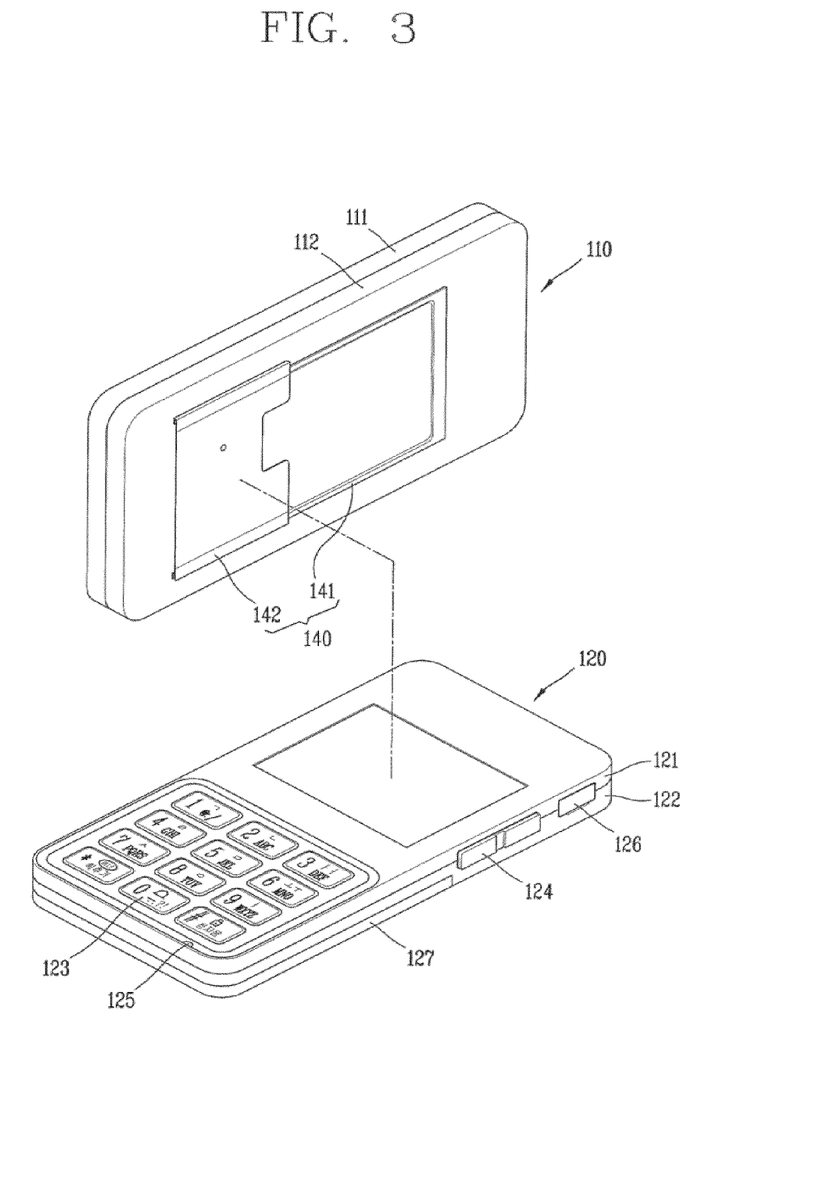
FIG. 3 is an exploded perspective view of the portable terminal shown in FIG. 1 that is disassembled into a first body and a second body.

FIG. 3 is an exploded perspective view of the portable terminal 100 shown in FIG. 1, in which the portable terminal is disassembled into the first body 110 and the second body 120. The slide module 140 is interposed between the first body 110 and the second body 120. The slide module 140 serves to guide the first body 110 to be slid with respect to the second body 120.

The slide module 140 includes a first slide member 141 and a second slide member 142 respectively mounted at the first body 110 and the second body 120. However, disclosed embodiments are not limited thereto. For example, the first slide member 141 and the second slide member 142 may be respectively mounted at the second body 120 and the first body 110. Alternatively, the first and second slide members 141, 142 may be respectively integrated with cases 111, 112, 121, 122 forming the external appearance of the first or second body 110, 120. The first and second slide members 141, 142 may be formed of a metal such as stainless steel (SUS), for example.

The first and second slide members 141, 142 are connected to each other to be respectively slid to each other. Referring to FIG. 3, the second slide member 142 is slidably coupled to the first slide member 141. The second slide member 142 may be configured to have portions adjacent to both edges encompassing portions adjacent to both edges of the first slide member 141. Accordingly, the second slide member 142 can be slid along both edges of the first slide member 141.

The slide module 140 is configured to be stoppable at a specific position when the slide module slides from the closed configuration to the open configuration. For example, in FIG. 3, the second slide member 142 is stopped at a position adjacent to one end of the first slide member 141, thus, the portable terminal 100 being in the open configuration.

Figure 4:
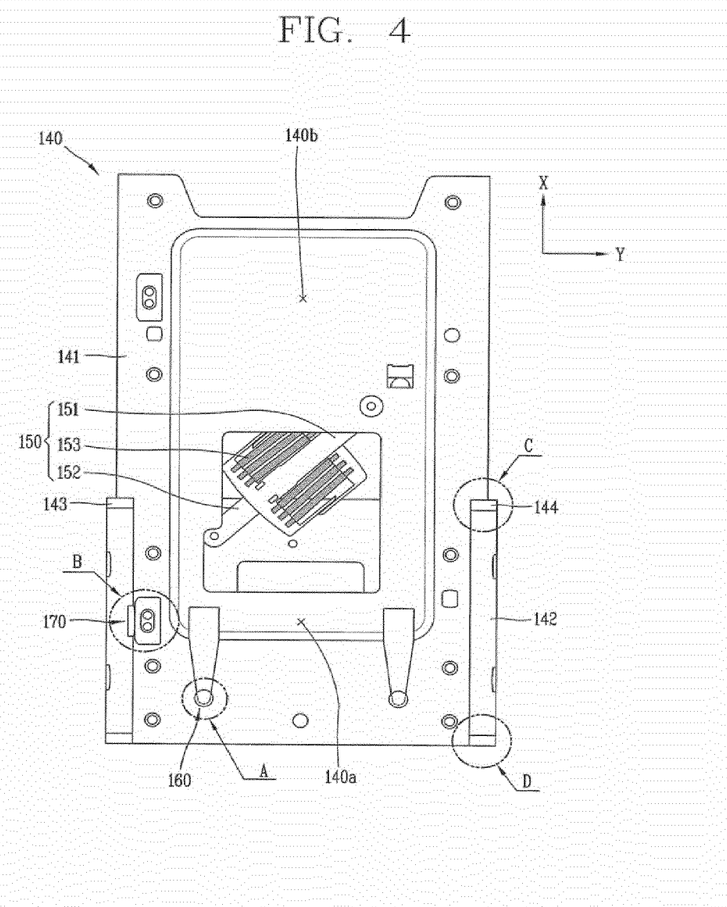
FIG. 4 is a section view of a slide module shown in FIG. 3 that is in an open configuration of a portable terminal.

FIG. 4 is a planar view of the slide module shown in FIG. 3 when the portable terminal 100 is in the open configuration. The slide module 140 includes an elastic module 150 configured to apply an elastic force to the first and/or second slide member 141,142 by a sliding operation.

The elastic module 150 includes first and second arm members 151, 152 and springs 153. Each of the first and second arm members 151, 152 have one end respectively connected to the first and second slide members 141, 142 and the other end respectively connected to the springs 153. The springs 153 generate the elastic force for further moving the second slide member 142 which has been moved by a certain distance according to the sliding operation of the slide module 140.

Smoothing members 143, 144 are interposed between the first and second slide members 141, 142 so as to reduce a friction between the first and second slide members 141, 142. The smoothing members 143, 144 may be formed of a synthetic resin, for example, Poly Oxy Methylene (POM). The smoothing members 143, 144 are mounted at the second slide member 142. The smoothing members 143, 144 may be implemented respectively at portions adjacent to both sides of the first and second slide members 141, 142.

The second slide member 142 is configured to be moved between a first position 140a and a second position 140b along the first slide member 141. A state in which the second slide member 142 is disposed at the first position 140a corresponds to the open configuration of the portable terminal 100, and a state in which the second slide member 142 is disposed at the second position 140b corresponds to the closed configuration.

The slide module 140 further includes fixation units 160, 170. The fixation units 160, 170 control the second slide member 142 such that the second slide member do not move with respect to the first slide member 141 in a direction interacting with the sliding direction when the second slide member 142 is slidingly moved to at least one position of the first or second positions 140a, 140b.

The fixation units 160, 170 are respectively associated with the first and second slide members 141, 142. The fixation units 160, 170 may include at least one of the first or second fixation units 160, 170. The first and second fixation units 160, 170 may be configured to prevent the second slide member 142 from being moved in first and second directions, respectively. The first and second directions may cross with each other. The sliding direction may be in an X-axis direction, the first direction may be in a Y-axis direction, and the second direction may be in a Z-axis direction, as shown in FIG. 5.

Figure 5:
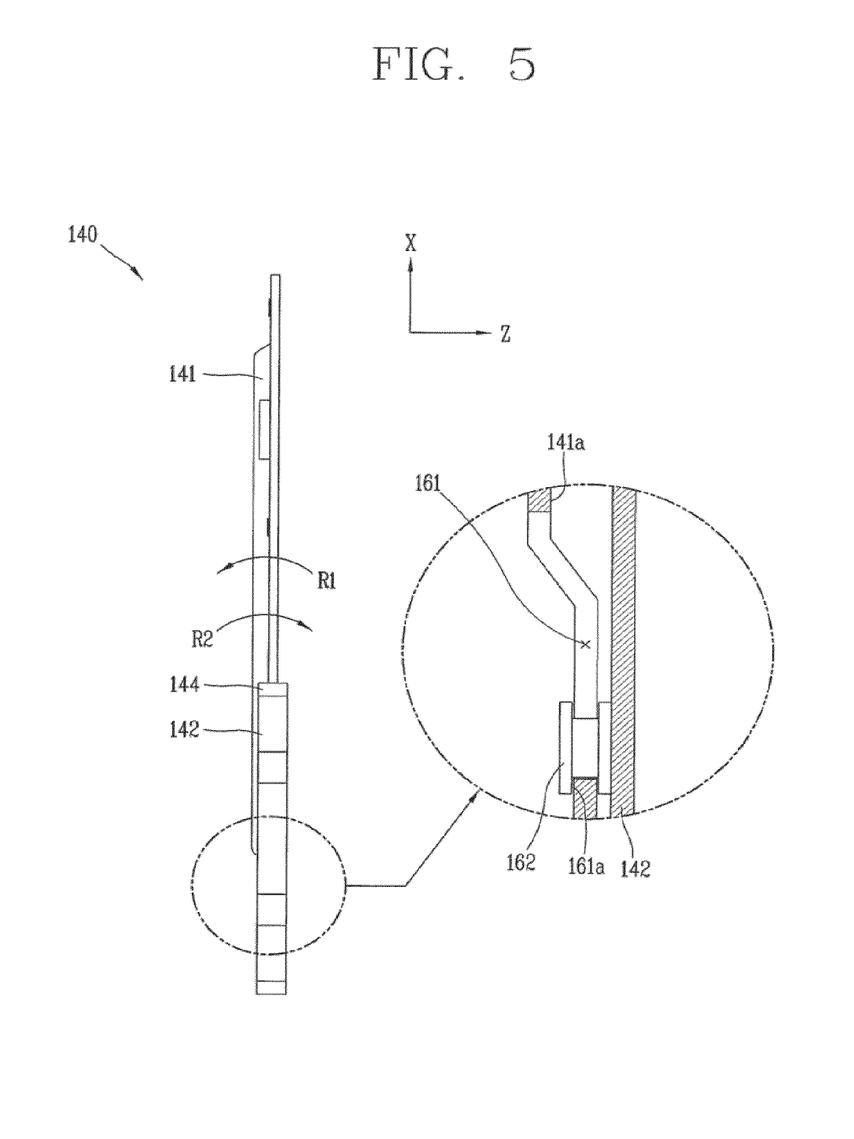
FIG. 5 is a side view of the slide module shown in FIG. 4.

FIG. 5 is a side view of the slide module 140 shown in FIG. 4 and FIGS. 6A to 6C are enlarged views partially showing portions (A, B, C) of the slide module 140. Further, FIG. 6D is a section view partially showing one portion (D) of the slide module 140 shown in FIG. 4.

The first and second slide members 141, 142 have main surfaces that are spaced from each other. Accordingly, the first and second slide members 141, 142 are not frictionized against each other during the sliding operation. Referring to FIG. 5, the first slide member 141 can move in both directions (R1, R2) centering on the second slide member 142 due to the space present between the first and second slide members 141, 142. Accordingly, the first body 110 and the second body 120 move with respect to each other in at least one of the directions R1 or R2.

Figure 6A:
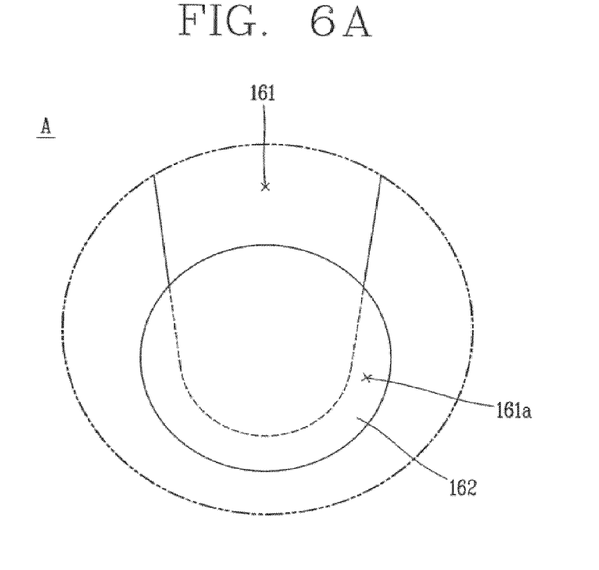
FIGS. 6A to 6C are enlarged views partially showing portions of the slide module shown in FIG. 4.

Referring to FIGS. 5 and 6A, the first fixation unit 160 will be explained. The first fixation unit 160 may be configured to restrict at least a part of the first slide member 141, thus reducing, preventing, inhibiting, and the like, the movement of the first slide member 141 that may be generated in the direction R1 or R2. Since the first slide member 141 is coupled to the first body 110, the first fixation unit 160 may reduce or prevent the movement of the first body 110 with respect to the second body 120.

The first fixation unit 160 is configured to control the first and second slide members 141, 142 such that they move in at least one direction such that the distance between the first and second slide members 141, 142 become farther or closer, or in both directions. The direction resulting in the farther distance serves as a plus direction of the Z-axis and the direction resulting in the closer distance serves as a minus direction of the Z-axis.

The first fixation unit 160 includes a hole portion 161 and a locking portion 162. The hole portion 161 may be formed at one of the first and second slide members 141, 142, and the locking portion 162 may be formed at the other one of the first and second slide members 141, 142. The hole portion 161 and the locking portion 162 are respectively formed at the first and second slide members 141, 142.

The locking portion 162 is locked by an area 161a adjacent to the hole portion 161. One end portion of the locking portion 162 may be connected to the second slide member 142. The locking portion 162 may be mounted at the second slide member 142 in a rivet coupling manner, a welding manner or the like, for example. Alternately, the locking portion 162 may be integrated with the second slide member 142. At least a part between both end portions of the locking portion 162 may be recessed such that the area 161 a adjacent to the hole portion 161 may be locked thereby.

The hole portion 161 is formed in a through hole that is configured to be long in one direction. The hole portion 161 is open at one end thereof and closed at the other end thereof. Accordingly, the locking portion 162 passing through the one end of the hole portion 161 is locked by the other end.

The hole portion 161 may be formed to have a width which is gradually narrowed in a direction in which the second slide member 142 is slid from the second position 140b to the first position 140a (see FIG. 4). Accordingly, the locking portion 162 is gradually locked by the hole portion 161 according to the sliding operation.

The hole portion 161 and the locking portion 162 being spaced from each other by a constant gap therebetween may be implemented in a plurality of numbers. However, the disclosed embodiments are not limited thereto. The number of the hole portion 161 and the locking portion 162 may be determined according to experimental data or experience of a designer, for example.

The first fixation unit 160 is configured to prevent the second slide member 142 from being slid in one of two directions that are off the direction of the second slide member 142 sliding between the first and second positions 140a, 140b. As the locking portion 162 is locked by one end portion of the hole portion 161, the second slide member 142 is restricted from moving in a minus direction of the X-axis.

The first slide member 141 is provided with a stepped area 141a that is stepped with respect to the area 161a adjacent to the hole portion 161. The elastic module 150 shown in FIG. 4 may be disposed at the stepped area 141a. Accordingly, a space for disposing the elastic module 150 between the first and second slide members 141, 142 may be provided.

The locking portion 162 is configured to be covered with the stepped area 141a when the second slide member 142 is disposed at one of the first or second positions 140a, 140b. The locking portion 162 is configured to be covered with the stepped area 141a when the second slide member 142 is disposed at the second position 140b. As the second slide member 142 is slid from the second position 140b into the first position 140a, the locking portion 162 covered with the stepped area 141a is protruded in the minus direction of the Z-axis relative to the area 161a adjacent to the hole portion 161.

Such first fixation unit 160 does not affect a thickness of the slide module 140. This allows the portable terminal 100 to have a slimmer configuration.

Hereafter, the second fixation unit 170 shown in FIG. 4 will be explained with reference to FIGS. 6B to 6D. The second fixation unit 170 is configured to press the first and second slide members 141, 42 in a direction in which the distance between the first and second slide members 141, 142 becomes farther.

The second slide member 142 is shaped to have recessed sections so that the sides of the second slide member 142 can receive the smoothing members 143, 144. The smoothing members 143, 144 have external shapes corresponding to inner surfaces of the recessed sections so as to be received in the recessed sections.

The smoothing members 143, 144 have sections configured to encompass at least one side of the first slide member 141. Accordingly, the smoothing members 143, 144 generate smoothing friction with the first slide member 141 during the sliding operation. The smoothing friction refers to the friction caused by the smoothing members 143, 144. While the above description is based on one side of the first and second slide members 141, 142, these embodiments are not limited thereto, but may be applied to both sides of the first and second slide members 141, 142.

Figure 6B:
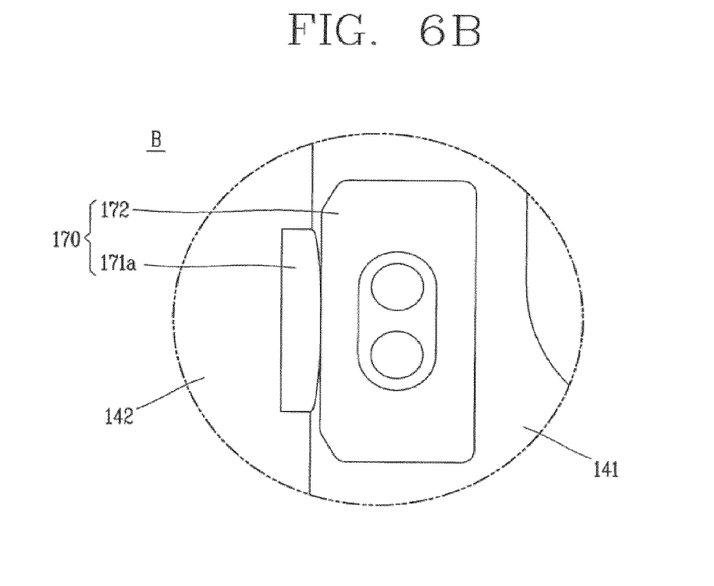

Referring to FIG. 6B, the second fixation unit 170 includes first and second protrusions 171a, 172. The first protrusion 171a is protruded from at least one portion of the smoothing member 143. The first protrusions 171a may be implemented between both end portions of the smoothing member 143. A through hole is formed at a portion where the smoothing member 143 of the second slide member 142 is encompassed such that at least one portion of the protruded portion of the smoothing member 143 may pass therethrough.

The second protrusion 172 is mounted at one of the first and second slide members 141, 142 and presses the first protrusion 171a. The first and second protrusions 171a, 172 are configured to be overlapped with each other before they come in contact with each other. The first and second protrusions 171a, 172 are elastically modified by contacting, pressing one another. At least one of the plurality of smoothing members 143, 144 is configured to press one of the first and second slide members 141, 142 at both end portions thereof.

Figure 6C:
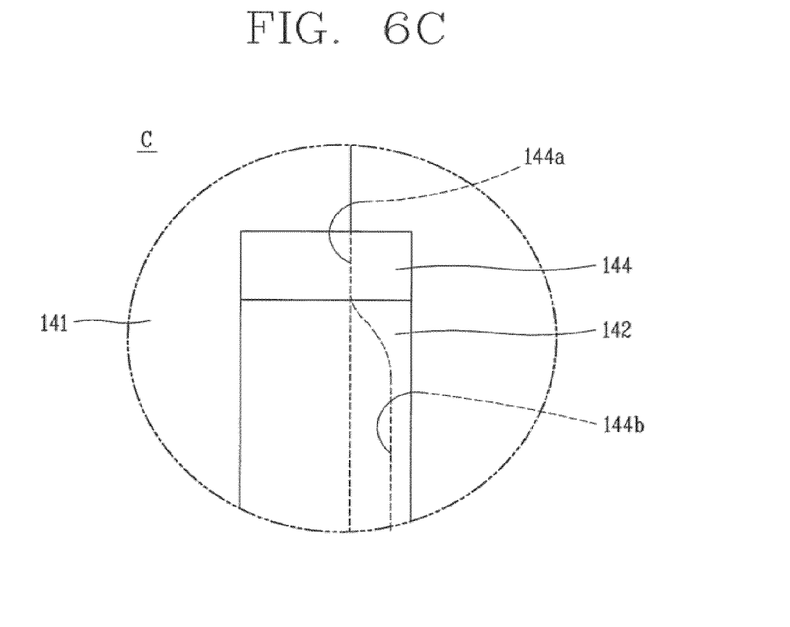
Figure 6D:
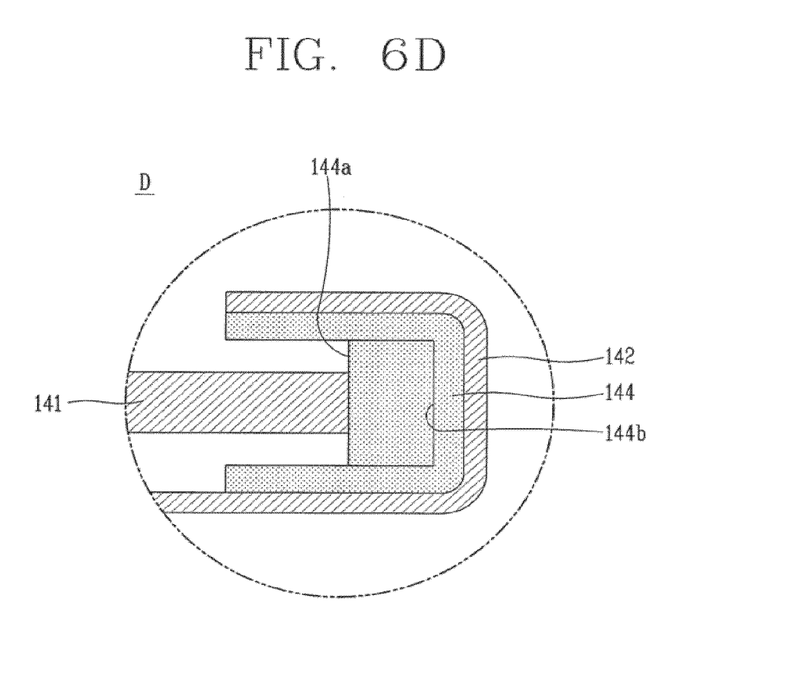
FIG. 6D is a section view partially showing one portion of the slide module shown in FIG. 4.

Referring to FIGS. 6C and 6D, the smoothing member 143 at which the first protrusion 171a is formed and the other smoothing member 144 are configured to press the first slide member 141 at both end portions thereof. The smoothing member 144 has a recessed section such that at least one side of the first slide member 141 can be received therein.

Both end portions 144a of the smoothing member 144 are configured to be recessed by a depth lower than that of a portion 144b between the both end portions. Accordingly, the smoothing member 144 more closely contacts the first slide member 141 at the both end portions 144a than the portion 144b between the both end portions. Accordingly, the second fixation unit 170 presses each side of the first slide member 141 when the second slide member 142 is disposed at the first position 140a.

Such second fixation unit 170 presses both sides of the first slide member 141. Accordingly, the movement of the slide module 140 in a Y-axis direction can be restricted. Further, the first and second protrusions 171a, 172 can be prevented from coming in contact with one another during the sliding operation of the slide module 140. Accordingly, the second fixation unit 170 can maintain the momentum for the sliding operation.

Figure 7:
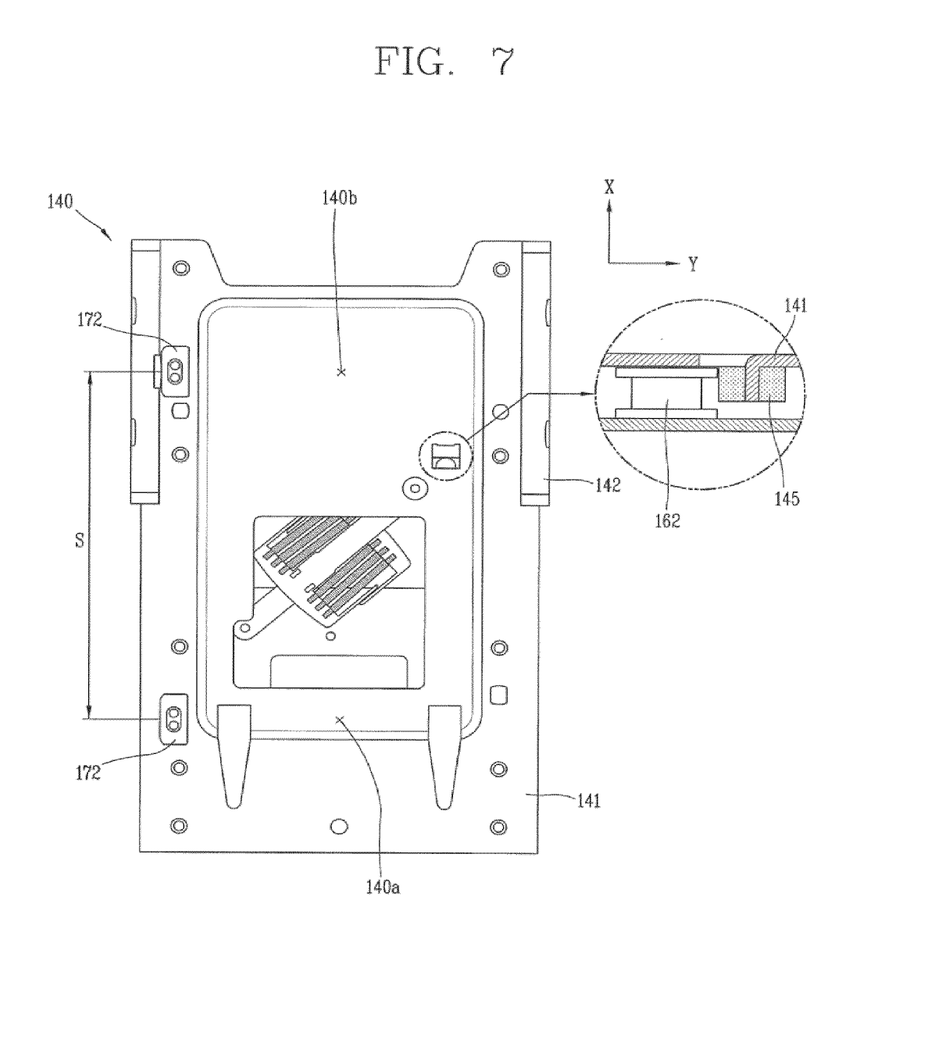
FIG. 7 is a planar view of the slide module shown in FIG. 3 that is in a closed configuration of a portable terminal.

FIG. 7 is a planar view of the slide module shown in FIG. 3 in the closed configuration of the portable terminal 100. The second protrusion 172 is disposed keeping a space (S) corresponding to a stroke caused by the sliding operation of the second slide member 142. The second fixation unit 170 can restrict movement of the slide module 140 in the Y-axis direction when the second slide member 142 is disposed at the second position 140b based on a mechanism described above referring to FIGS. 6C to 6E. Such mechanism will be understood by those of ordinary skill in the art upon reading the present disclosure.

A stopper 145 may be mounted at the first slide member 141. The stopper 145 serves to control the second slide member 142 not to be slid in the sliding direction together with the first fixation unit 160 so as not to be moved out of the space between the first position 140a and the second position 140b. The stopper 145 is configured to come in contact with the locking portion 162 when the second slide member 142 is disposed at the second position 140a. The stopper 145 may be further configured to limit the movement of the second slide member 142 in a plus direction of the X-axis. The stopper 145 may serve to absorb an impact occurring when the second slide member 142 stops sliding. The stopper 145 may be formed of rubber, for example.

Figure 8:
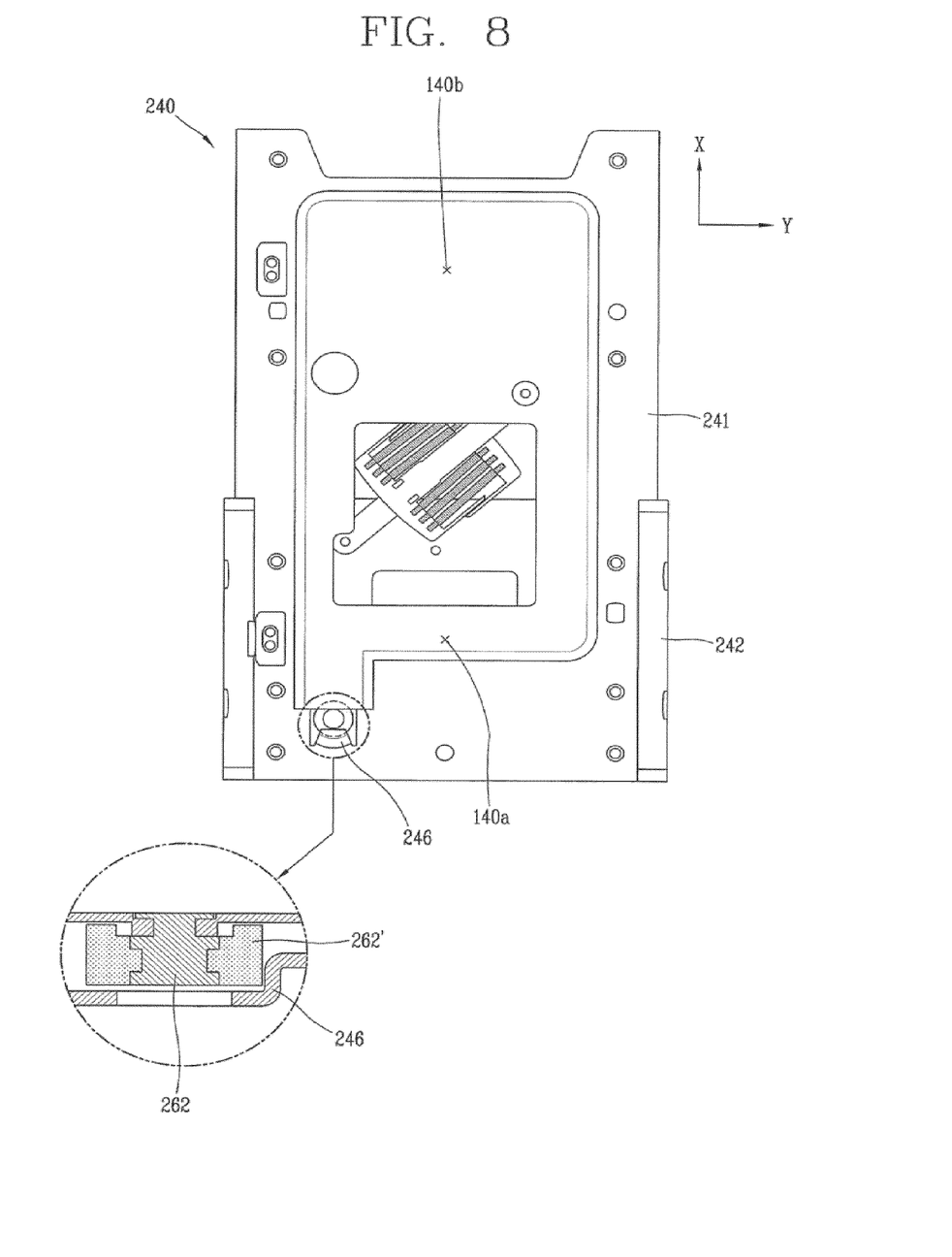
FIG. 8 is a planar view of a slide module with a first fixation unit in accordance with an alternative embodiment of the present invention.

FIG. 8 is a planar view of the first fixation unit according to an alternative embodiment of the present invention. A locking portion 262 is coupled to a bushing 262'. A cover 246 protruded at one portion adjacent to a hole portion 261 is formed at a first slide member 241 so as to cover at least one portion of the bushing 262'. As the cover 246 covers the bushing 262', movement of a slide module 240 in a Z-axis direction is restricted. In this embodiment, the locking portion 262 may be covered with the cover 246 without being coupled with the bushing 262'.

The cover 246 has a circumference corresponding to an outer circumference of the bushing 262' and is configured to encompass at least one portion of the outer circumference of the bushing 262'. Accordingly, it is capable of restricting movement of the slide module 240 in the Y-axis direction.

Figure 9:
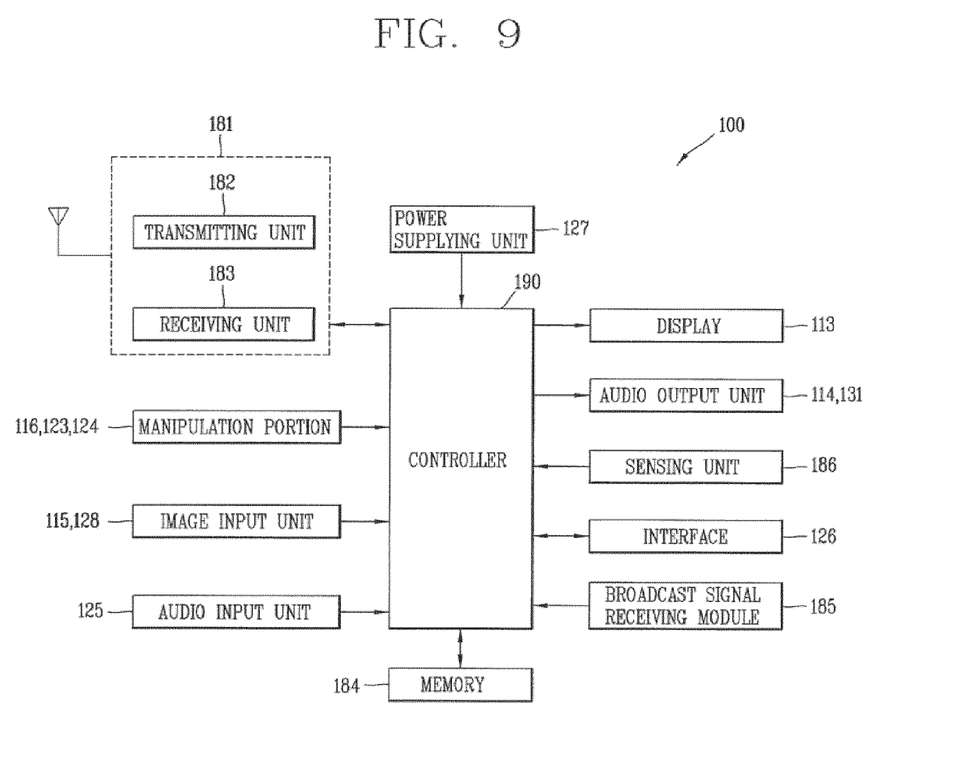
FIG. 9 is a block diagram of a portable terminal in accordance with an embodiment of the present invention.

FIG. 9 is a block diagram showing components of a portable terminal 100 in accordance with an embodiment of the present invention. Referring to the FIG. 9, the portable terminal in accordance with one embodiment of the present invention includes a wireless communication module 181, manipulation portions 116, 123, 124, image input units 115, 128, an audio input unit 125, a display 113, audio output units 114, 131, a sensing unit 186, an interface 126, a broadcast signal receiving module 185, a memory 184, a power supply unit 127 and a controller 190.

The controller 190 generally serves to control overall operations of the portable terminal 100. For example, controlling and processing related to a voice call, a data communication, a video call, and the like are controlled by the controller 190. In addition, the controller 190 further controls an operation of the portable terminal 100.

The wireless communication module 181 transmits/receives a radio (wireless) signal to/from a mobile communication base station via an antenna. For example, the wireless communication module 181 serves to transmit/receive voice data, character data, image data and control data under control of the controller 190, and includes a transmitting unit 182 modulating a signal to be transmitted and transmitting the signal and a receiving unit 183 demodulating the received signal.

The manipulation portions 116, 123, 124 are configured as shown in FIG. 1 and provide the controller 190 with key input data inputted to control the operations of the portable terminal 100 by the user. The manipulation portions 116, 123, 124 may be implemented as a dome switch, a touch pad (static pressure/capacitance), a jog wheel, a jog switch, or the like.

The image input units 115, 128 process a video frame such as still images or moving pictures obtained by an image sensor in a video call mode or shooting mode. The processed video frame is converted into image data that can be displayed on the display 113 and outputted through the display 113. The video frame processed by the image input units 115, 128 is stored in the memory 184 under control of the controller 190 or outwardly transmitted through the wireless communication module 181.

The audio input unit 125 receives an external audio signal through a microphone in the call mode, the recording mode or the voice recognition mode and processes the signal into electric voice data. For example, in the call mode, the processed voice data is converted into a transmittable format toward the mobile communication base station through the wireless communication module 181 and then outputted to the wireless communication module. In the recording mode, the processed voice data is outputted to be stored in the memory 184. The audio input unit 125 may implement various noise reduction algorithms for reducing noise generated in a process for inputting the external audio signal.

The display 113 outputs information processed in the portable terminal 100. For example, in the case that the portable terminal 100 is in the call mode, a User Interface (UI) or Graphic User Interface (GUI) related to the calling is outputted under control of the controller 190. In the case that the portable terminal 100 is in the video call mode or shooting mode, the shot image or UI or GUI is outputted under control of the controller 190. When the portable terminal 100 includes a touch screen, the display 113 is used as an input device as well as an output device.

The audio output units 114, 131 convert audio data received from the wireless communication module 181 or audio data stored in the memory 184 and outwardly output the audio data under control of the controller 190 in a call signal receiving mode, the call mode, the recording mode, the voice recognition mode or the broadcast receiving mode. The audio output units 114, 131 also output an audio signal related to functions executed in the portable terminal 100, for example, call signal receive sound, message receive sound, and the like. The audio output units 114, 131 include a speaker, a receiver, a buzzer, and the like.

The sensing unit 186 senses a current status of the portable terminal 100 such as an open/closed status of the portable terminal, a position of the portable terminal, whether or not a user contacts the portable terminal, and then generates a sensing signal for controlling the operations of the portable terminal. For example, in the case that the portable terminal 100 is implemented in a slide type phone, the sensing unit 186 senses whether or not the slide phone is open and outputs the sensing result to the controller 190, and the operations of the portable terminal are controlled accordingly. Further, the sensing unit 186 serves to sense whether or not the power supply unit 127 supplies the power, whether or not the interface 126 is coupled to an external device.

The interface 126 serves as an interface with all external devices connected thereto, such as a wire/wireless headset, an external charger, a wire/wireless data port, a card socket, such as memory card and SIM/UIM card, and the like. Such interface 126 allows the data or power transmitted or supplied from the external device to be transferred to each component inside of the portable terminal 100, or the data inside of the portable terminal to be transmitted to the external device.

In the memory 184, a program for processing and controlling the controller 190 may be stored therein, or the inputted/outputted data, such as phonebook, message, still image, moving picture, and the like, may be temporally stored therein. The memory 184 also stores a program for controlling the operation of the portable terminal 100 according to the present invention. The memory 184 may be implemented as a hard disk, a flash memory, a RAM, a ROM, a card-type memory, such as SD and XD memory, and the like.

The broadcast signal receiving module 185 serves to receive a broadcast signal transmitted through a satellite wave or a ground wave and output to the controller 190 by converting the signal into a broadcast data format that can be outputted to the audio output units 114, 131 and the display 113. The broadcast signal receiving module 185 also receives additional data, such as EPG (Electric Program Guide), channel list, and the like, that are related to the broadcasting. The additional data and the broadcast data converted by the broadcast signal receiving module 185 may be stored in the memory 184.

The power supply unit 127 is applied with an external or internal power under control of the controller 190 and then supplies the power required for the operation of each component.

As described above, one embodiment includes implementing a slide module in a portable terminal reduces or prevents unnecessary movement of the first and second bodies. Thus, stability and reliability of the portable terminal may be enhanced. Further, as the fixation units are provided at the slide module, unnecessary movement of the slide module can be reduced or prevented. This allows the portable terminal to have a slimmer configuration. The sliding operation of the portable terminal can be performed more easily, reducing or preventing unnecessary movement of the bodies at the same time.

It will be apparent to those skilled in the art that various modifications and variations can be made without departing from the spirit or scope of the invention. Thus, it is intended that the present invention covers the modifications and variations of this invention provided they come within the scope of the appended claims and their equivalents.

What is claimed is:

1. A portable terminal comprising:
a first body;
a second body; and
a slide module slidably coupling the first body and the second body, the first body and the second body sliding with respect to each other via the slide module,
wherein the slide module comprises:
a first slide member;
a second slide member configured to slide with respect to the first slide member between a first position and a second position; and
a fixation unit configured to:
position the first slide member and the second slide member stably at one of the first and second positions; and
allow only a sliding movement between the first and the second positions in a vertical direction, inhibiting relative movement of the first and second slide members in directions other than the vertical direction,
wherein the fixation unit comprises at least a first fixation unit or a second fixation unit, the first fixation unit being coupled to a portion of the first sliding member and configured to inhibit movement of the second sliding member in a first direction that substantially crosses with the vertical direction, and the second fixation unit being coupled to a portion of the second sliding member and configured to inhibit movement of the second sliding member in a second direction that is substantially perpendicular to the first direction.

2. The portable terminal of claim 1, wherein the first fixation unit is further configured to inhibit movement of the first and second slide members in at least one of two directions, one direction being a direction in which the movement causes the first and second slide members to be further apart from each other, and the other direction being a direction in which the movement brings the first and second slide members closer to each other.

3. The portable terminal of claim 1, wherein the first fixation unit is further configured to prevent the second slide member from sliding in one direction in which the second slide member pulls away from the vertical direction between the first position and the second position.

4. The portable terminal of claim 1, wherein the first fixation unit comprises:
a hole portion formed at one of the first and second slide members; and
a locking portion formed at the other one of the first and second slide members and disposed to be locked at an area adjacent to the hole portion.

5. The portable terminal of claim 4, wherein the hole portion is a through hole that is extended in one direction.

6. The portable terminal of claim 4, wherein the first slide member comprises a stepped area that is stepped with respect to the area adjacent to the hole portion, and the locking portion is covered by the stepped area when the second slide member is positioned at one of the first position and the second position.

7. The portable terminal of claim 4, wherein one end portion of the locking portion is connected to the second slide member and at least a portion is recessed at a space between both end portions of the locking portion such that the area adjacent to the hole portion is locked.

8. The portable terminal of claim 3, further comprising a stopper configured to prevent the second slide member from sliding in the other direction in which the second slide member pulls away from the vertical direction between the first position and the second position.

9. The portable terminal of claim 1, wherein the second fixation unit is configured to press the first and second slide members in a direction to move the first and second slide members further apart.

10. The portable terminal of claim 1, further comprising smoothing members disposed between the first slide member and the second slide member, and configured to reduce friction between the first and second slide members.

11. The portable terminal of claim 10, wherein the second fixation unit comprises:
first protrusions protruded from at least one portion of the smoothing members; and
second protrusions mounted at one of the first slide member and second slide member, and configured to press the first protrusions.

12. The portable terminal of claim 11, wherein the second protrusions are disposed to define a space corresponding to a stroke caused by the sliding of the second slide member.

13. The portable terminal of claim 10, wherein the smoothing members are disposed at portions adjacent to both sides of the first and second slide members and at least one of the smoothing members is configured to press one of the first and second slide members at both end portions.

14. The portable terminal of claim 1, wherein the portable terminal is in one of an open and closed configurations when the second slide member is slid to the first position, and is in the other one of the open and closed configurations when the second slide member is slid to the second position.

15. A slide module comprising:
a first slide member;
a second slide member configured to slide with respect to the first slide member between a first position and a second position; and
a fixation unit configured to:
position the first slide member and the second slide member stably at one of the first and second positions; and
allow only a sliding movement between the first and the second positions in a vertical direction, inhibiting relative movement of the first and second slide members in directions other than the vertical direction,
wherein the fixation unit comprises at least a first fixation unit or a second fixation unit, the first fixation unit being coupled to a portion of the first sliding member and configured to inhibit movement of the second sliding member in a first direction that substantially crosses with the vertical direction, and the second fixation unit being coupled to a portion of the second sliding member and configured to inhibit movement of the second sliding member in a second direction that is substantially perpendicular to the first direction.

16. The slide module of claim 15, wherein the first fixation unit comprises:
a hole portion formed at one of the first and second slide members; and
a locking portion formed at the other one of the first and second slide members and disposed to be locked at an area adjacent to the hole portion.

17. The slide module of claim 16, wherein one end portion of the locking portion is connected to the second slide member and at least a portion is recessed at a space between both end portions of the locking portion such that the area adjacent to the hole portion is locked.

18. The slide module of claim 15, wherein the second fixation unit is configured to press the first and second slide members in a direction to move the first and second slide members further apart.

19. The slide module of claim 15, further comprising smoothing members disposed between the first slide member and the second slide member, and configured to reduce friction between the first and second slide members, and the second fixation unit comprises:
- first protrusions protruded from at least one portion of the smoothing members; and
- second protrusions mounted at one of the first slide member and second slide member, and configured to press the first protrusions.

* * * * *